(12) United States Patent
Witt et al.

(10) Patent No.: US 11,253,829 B2
(45) Date of Patent: Feb. 22, 2022

(54) PROCESS FOR PRODUCING SOLID PARTICLES

(71) Applicant: LANXESS DEUTSCHLAND GMBH, Cologne (DE)

(72) Inventors: Michael Witt, Eckersdorf (DE); Nikolaj Caspers, Leverkusen (DE); Ulrich-Peter Szczecina, Leverkusen (DE)

(73) Assignee: LANXESS Deutschland GmbH, Cologne (DE)

(*) Notice: Subject to any disclaimer, the term of this patent is extended or adjusted under 35 U.S.C. 154(b) by 250 days.

(21) Appl. No.: 16/063,348

(22) PCT Filed: Nov. 29, 2016

(86) PCT No.: PCT/EP2016/079138
§ 371 (c)(1),
(2) Date: Jun. 18, 2018

(87) PCT Pub. No.: WO2017/102311
PCT Pub. Date: Jun. 22, 2017

(65) Prior Publication Data
US 2018/0361336 A1 Dec. 20, 2018

(30) Foreign Application Priority Data
Dec. 18, 2015 (EP) .................................... 15201214

(51) Int. Cl.
*B01J 2/20* (2006.01)
*B29B 9/06* (2006.01)
(Continued)

(52) U.S. Cl.
CPC ..................... *B01J 2/20* (2013.01); *B29B 9/06* (2013.01); *B29B 9/12* (2013.01); *B29C 48/0022* (2019.02);
(Continued)

(58) Field of Classification Search
None
See application file for complete search history.

(56) References Cited

U.S. PATENT DOCUMENTS

| 4,642,211 A | 2/1987 | Elbs et al. |
| 5,169,582 A | 12/1992 | Illing |

(Continued)

FOREIGN PATENT DOCUMENTS

| DE | 19913661 A1 | 9/2000 |
| GB | 1390971 A | 4/1975 |
| JP | 11058373 A2 | 3/1999 |

OTHER PUBLICATIONS

International Search Report from corresponding International Application No. PCT/EP2016/079138, dated Feb. 23, 2017, three pages.

*Primary Examiner* — Peter L Vajda
*Assistant Examiner* — Adrianna N Konves
(74) *Attorney, Agent, or Firm* — Nicanor A. Kohncke; Christopher L. McDavid; Ewa M. Wozniak

(57) ABSTRACT

Process for the production of solid particles comprising a material with melting point from −20 to 300° C. at atmospheric pressure, characterized in that a mixture comprising:
a1) the material in molten form and
a2) the material in solid form
is mixed by means of an extruder to give a paste, this is forced through a pelletizing die to give strands, and the strands are comminuted.

13 Claims, 1 Drawing Sheet

(51) Int. Cl.
  *B29B 9/12* (2006.01)
  *C08G 69/18* (2006.01)
  *C08G 69/20* (2006.01)
  *B29C 48/00* (2019.01)
  *C08G 69/14* (2006.01)
  *B29K 77/00* (2006.01)
  *B29K 105/00* (2006.01)
  *B29C 48/04* (2019.01)
  *B29C 48/05* (2019.01)

(52) U.S. Cl.
  CPC ............ *C08G 69/14* (2013.01); *C08G 69/18* (2013.01); *C08G 69/20* (2013.01); *B29B 9/065* (2013.01); *B29C 48/022* (2019.02); *B29C 48/04* (2019.02); *B29C 48/05* (2019.02); *B29K 2077/00* (2013.01); *B29K 2105/251* (2013.01)

(56) References Cited

U.S. PATENT DOCUMENTS

| | | |
|---|---|---|
| 5,747,634 A | 5/1998 | Schmid et al. |
| 2003/0032766 A1 | 2/2003 | Schmid et al. |
| 2010/0197571 A1* | 8/2010 | Kanikanti ............ A61K 9/0053 514/1.1 |
| 2015/0051368 A1 | 2/2015 | Kugler et al. |

\* cited by examiner

Diagram of design of the pellet chopper:
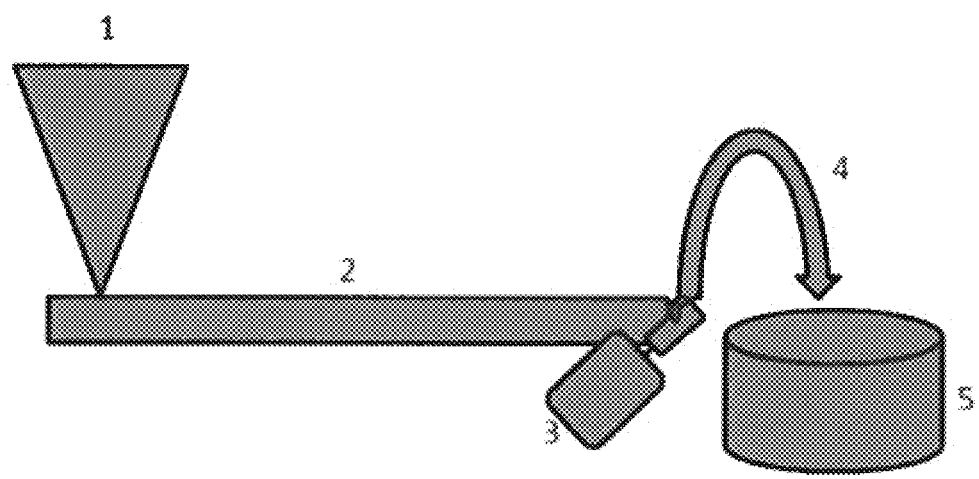

PROCESS FOR PRODUCING SOLID PARTICLES

The invention relates to a process for the production of solid particles of a material with specific melting point via extrusion of a two-phase mixture comprising this material and subsequent comminution.

Many low-molecular-weight compounds feature a defined melting point at which the solid becomes a low-viscosity melt ($<1\cdot10^4$ Pa·s).

This type of low-viscosity inch cannot be processed in conventional compounding systems essentially consisting of an extruder and of a pelletizing unit.

We describe this problem in more detail with reference to monomeric caprolactam as example:

Monomeric caprolactam is currently marketed both in the molten state and as a solid.

The solid is preferred for transport of relatively small quantities of caprolactam or transport over relatively long distances.

In particular for anionic polymerization of caprolactam, it can be advantageous that the activator and/or the catalyst is pre-incorporated into solid caprolactam particles, in order to provide storable instant mixtures for the anionic polymerization of caprolactam.

WO02013/034499 describes this type of concept.

An established process for the production of solidified caprolactam which can be packaged into sacks and transported on pallets is based on cooled rolls, the underside of which is immersed in a pool of caprolactam melt. During rotation of these cooled rolls, the caprolactam freezes to give a surface layer, which is then removed by a scraper blade.

This gives caprolactam flakes, the thickness of which can be varied by way of the temperature of the melt, the rotation rate and the cooling rate.

These caprolactam flakes have the disadvantage of comprising a relatively large proportion of fines, and the flakes moreover are susceptible to caking during transport.

In particular, after transport to the customer these flakes often cause problems during subsequent further processing in the factory when suction-conveying systems are used, or during input into screw-conveying systems.

The same disadvantages apply to the instant mixtures described in WO2013/034499 if these have been produced in flake form.

EP786485 describes a continuous process for activated lactam polymerization with the following steps: introduction, into heatable continuously operating mixing and conveying equipment, of a lactam and of a system that is stable in storage and liquid at room temperature, simultaneously comprising catalyst and activator, heating of the lactam to the process temperature with mixing of the melts and polymerization, discharge of the melt in the form of strand and subsequent cooling and palletization.

BP 1390971 describes a process for the production of solid caprolactam particles with good flowability which is in essence based on introduction of molten caprolactam by way of nozzles into a fluidized bed of solid caprolactam. It is thus possible to produce spherical particles with improved flowability which exhibit less caking during transport and which can give better results during further processing.

The process described in BP 1390971 has the disadvantage of being expensive in relation to inertization of the fluidized bed and in relation to control of throughput and particle size.

Object

A process was therefore sought that can provide simple, robust, inexpensive production of solid particles while avoiding the prior-art disadvantages mentioned.

A process has now been found for the production of solid particles comprising a material with melting point from −20 to 300° C. at atmospheric pressure, characterized in that a mixture comprising:
  a1) the material in molten form and
  a2) the material in solid form
is mixed by means of an extruder to give a paste, this is forced through a pelletizing die to give strands, and the strands are comminuted.

Extrusion

The mixture to be extruded here, comprising components a1) and a2), can be obtained via
  i) separate feed of components a1) and a2) to the extruder or
  ii) feed of component a2) to the extruder and production of component a1) via heating and/or via introduction of energy from the conveying elements and/or shear elements, in particular screws of the extruder, to reach a temperature at which some of component a2) has melted or
  iii) feed of component a1) to the extruder and production of component a2) via cooling of the extruder to a temperature at which some of component a1) solidifies.

No further restrictions are placed upon the solid component a2) for purposes of feed of the solid component a2) to the extruder.

For purposes of feed of the molten material of component a1) to the extruder, it is preferable to select the melting point of the material or a temperature that is higher by up to 20° C., in particular by up to 10° C. Insofar as component a1) comprises other ingredients that shift the melting point of component a1) to below that of the material, it is also possible to select this reduced melting point or a temperature that is higher by up to 20° C., in particular by up to 10° C. The temperature of the melt of component a1) here should, together with the temperature of the solid phase of component a2), be selected appropriately for the temperature of the extruder and for the frictional heat generated in the interior of the extruder in a manner that ensures the presence of both phases during extrusion.

It is preferable during the process of the invention to select a ratio by weight of the liquid component a1) to the solid component a2) that is from 1:1 to 1:4, in particular from 1:1.5 to 1:4, in particular from 1:2.3 to 1:4.

The temperature of the extruder here can also be below the melting point of the material, because the extrusion procedure produces frictional heat, in particular via the conveying elements and/or shear elements of the extruder, in particular of the screws, and this heat is preferably sufficient to keep at least some of the material molten.

The extruder used can be a single-screw, twin-screw, or planetary extruder. The twin-extruders can have conveying elements and also additional mixing elements.

A preferred extruder is a twin-screw extruder.

At the end of the plastification process via the extruder, the resultant paste, the temperature of which is preferably the melting point of the mixture, comprising components a1) and a2), is then forced through a pelletizing die to give strands.

The paste preferably comprises at least 80% by weight of the material, preferably at least 90% by weight.

Comminution

The pelletizing die here can have one or more apertures (holes). The pelletizing die preferably has from 1 to 20 apertures, in particular round apertures, preferably with diameter from 0.1 to 20 mm, in particular from 0.3 to 0.8 mm.

The resultant strands are then comminuted.

It is particularly advantageous to use a rotating blade to comminute the strand discharged from the pelletizing die to give small particles and then to use a stream of dry air, or an inert gas, to cool these particles until the surfaces are no longer tacky and the individual particles do not cake when they contact one another. After appropriate cooling, the particles can be collected in relatively large packs and can be drawn off into sacks.

The size of the solid particles after the process of the invention is preferably from 0.2 to 30 mm, in particular from 0.2 to 20 mm. In particular, the shape of the resultant particles is spherical, with aspect ratio from 1 to 3, preferably from 1 to 1.8, in particular from 1 to 1.4. Their shape can also be cylindrical, preferably with diameter from 0.2 to 30 mm, in particular from 0.2 to 20 mm, and length from 0.3 to 30 mm.

Alternatively, it is also possible to use what is known as a liquid pelletization system analogous to the traditional underwater pelletizer, but preferably avoiding water for moisture-sensitive materials, such as cyclic amides, for example caprolactam. Liquids that can be used for materials of this type are any of the anhydrous liquids that have no CH-acidic groups, an example being $CO_2$ liquefied under pressure.

Material

Material used is preferably one with melting point from 50 to 250° C. at atmospheric pressure, in particular from 50 to 170° C., in particular from 50 to 160° C.

Preference is likewise given to a material that is not polymeric. Preference is equally given to a material with molar mass below 1000 g/mol, preferably below 500 g/mol.

The viscosity of particularly preferred materials in molten form at their melting point under atmospheric pressure is less than $1 \times 10^4$ Pa·s.

Very particularly preferred material is a cyclic amide of component, preferably an amide with the general formula (I),

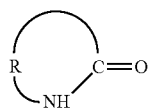

(I)

where R is a C3-C13 alkylene group, in particular a C5-C11 alkylene group.

Particularly suitable cyclic amides are lactams of the formula (I) such as ε-caprolactam, 2-piperidone (δ-valerolactam), 2-pyrrolidone (γ-butyrolactam), enantholactam, laurolactam, laurinlactam or a mixture of these. It is preferable that the cyclic amide is caprolactam, laurolactam or a mixture of these. It is particularly preferable that material used is exclusively caprolactam or exclusively laurolactam.

Components a1) and a2) in the process of the invention can respectively mutually independently comprise other ingredients alongside the material. Preferred ingredients that may be mentioned for the case where the material is a cyclic amide, in particular caprolactam, laurolactam or a mixture of these, are the conventional catalyst and/or activators for the anionic polymerization of caprolactam.

These ingredients can also be added separately to the process during extrusion. This addition preferably takes place in the intake region of the extruder, for example by way of mixing elements, preferably with the aim of achieving homogeneous distribution of said additives.

In respect of concomitant use of activators or catalysts when cyclic amides are used as material, preference is given to the process where at least one activator or at least one catalyst is used.

The catalyst for the polymerization of the cyclic amide is preferably selected from the group consisting of sodium caprolactamate, potassium caprolactamate, magnesium bromide caprolactamate, magnesium chloride caprolactamate, magnesium biscaprolactamate, sodium hydride, sodium, sodium hydroxide, sodium methanolate, sodium ethanolate, sodium propanolate, sodium butanolate, potassium hydride, potassium hydroxide, potassium methanolate, potassium ethanolate, potassium propanolate and potassium butanolate, with preference from the group consisting of sodium hydride, sodium caprolactamte, and is particularly preferably sodium caprolactamte.

The molar ratio of cyclic amide to catalyst can vary widely, and is generally from 1:1 to 10000:1, preferably from 5:1 to 1000:1, particularly preferably from 1:1 to 500:1.

The mixture to be extruded preferably comprises
from 96 to 99.9% by weight of at least one cyclic amide, in particular from 97 to 99.9% by weight, particularly preferably from 97.5 to 99.5% by weight, and
from 0.1 to 4.0% by weight of at least one catalyst, preferably from 0.1 to 3% by weight, particularly preferably from 0.5 to 2.5 parts by weight, of at least one catalyst,
based in each case on the total weight of the mixture.

Suitable activators are inter ilia aliphatic diisocyanates, for example butylene diisocyanate, hexamethylene diisocyanate octamethylene diisocyanate, decamethylene diisocyanate, undecamethylene diisocyanate, dodecamethylene diisocyanate, methylenebis(cyclohexyl 4-isocyanate), isophorone diisocyanate, aromatic diisocyanates, for example tolylene diisocyanate, methylenebis(phenyl 4-isocyanate), or polyisocyanates (e.g. isocyanates of hexamethylene diisocyanate), or allophanates (e.g. ethyl allophanate). In particular, mixtures of the compounds mentioned can be used as activators.

Other suitable activators are aliphatic diacyl halides, for example butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, 4,4'-methylenebis(cyclohexyloyl chloride), 4,4'-methylenebis(cyclohexyloyl bromide), isophoronedioyl chloride, isophoronedioyl bromide, and also aromatic diacyl halides, for example tolylenemethylenedioyl chloride, tolylenemethylenedioyl chloride, 4,4'-methylenebis(phenyloyl chloride), 4,4'-methylenebis(phenyloyl bromide). In particular, mixtures of the compounds mentioned can be used as activators.

In particular, preference is given as activator to at least one compound selected from the group consisting of aliphatic polyisocyanates, in particular diisocyanates, aromatic polyisocyanates, in particular diisocyanates, aliphatic diacyl halides and aromatic diacyl halides. It is preferable that the polyisocyanates, in particular aliphatic polyisocyanates, are used in the form of blocked isocyanates.

In a preferred embodiment, at least one compound used as activator is selected from the group of hexamethylene diisocyanate, isophorone diisocyanate, hexamethylenedioyl bromide, hexamethylenedioyl chloride and mixtures of these. It is particularly preferable to use hexamethylene diisocyanate as activator of component a1), in particular in the form of blocked isocyanate. A compound suitable as activator is by way of example a caprolactam-blocked hexamethylene 1,6-diisocyanate. A solution of a caprolactam-blocked hexamethylene 1,6-diisocyanate in caprolactam is obtainable commercially as Brueggolen® C20 from Brueggemann or Addonyl® 8120 from Rhein Chemie Rheinau GmbH.

The molar ratio of cyclic amide to activator can vary widely, and is generally from 1:1 to 10000:1, preferably from 5:1 to 2000:1, particularly preferably from 20:1 to 1000:1.

It is likewise preferable that the mixture to be extruded comprises
- from 90 to 99.8% by weight of at least one cyclic amide, in particular from 92 to 99% by weight, particularly preferably from 97 to 98.5% by weight and
- from 0.2 to 10.0% by weight of at least one activator, in particular from 1 to 8% by weight, particularly preferably from 1.5 to 3% by weight, based in each case on the total weight of the mixture.

The process of the invention can produce solid particles with uniform mass and shape and with a very small proportion of fines. The solid particles obtained after the process of the invention moreover have very good flowability and also do not cake during prolonged storage.

EXAMPLES

Example 1

Extruder used: twin-screw extruder (Leistritz ZSE 27 Maxx-480)
Heating zones: 11 (L/D: 48)
Pelletizing die: 1 conical holes with 3.2 mm diameter
Machine parameters: screw rotation rate: 80 UpM
Temperatures: all zones 68° C. except for zone 1 (66° C.) and zone 11 (67° C.)

The strands discharged through the pelletizing die of the pelletizing unit were chopped by a mechanical chopper unit and collected after from 1 to 3 seconds after a flight time in dry air. Cooling of the particles during this time was sufficient to prevent caking.

FIG. 1 is a diagram of the procedure, where the individual components are as follows:
(1) Material intake
(2) Extruder
(3) Manual mixer with wire-basket mixing head
(4) Flight path of chopped paste particles
(5) Collection container.

Specifically, the discharged caprolactam strands were chopped with the aid of a conventional manual mixer with a wire-basket stirrer in a manner that projected them along a parabolic flight path into a collection container 2 m away from the die. The substantially spherical or cylindrical particles of size from 3-4 mm were cooled to room temperature and, by virtue of their good flowability, could very easily be poured from one container to another. They also exhibited very good resistance to caking after packaging in sacks and exposure of these to mechanical stress during storage. Furthermore, absolutely no fines were produced.

About 50 g of each mixture was stored in a gastight jar with screw cap.

Example 2

As example 1, but a premix made of 96% by weight of caprolactam and 4% by weight of Addonyl Kat NI from Rhein Chemie Rheinau GmbH (18% by weight of sodium caprolactamate in caprolactam) was used as starting material. The intake region of the extruder was inertized with nitrogen.

Example 3

As example 1, but a premix made of 98% by weight of caprolactam and 2% by weight of Addonyl 8120 from Rhein Chemie Rheinau GmbH (caprolactam-blocked hexamethylene diisocyanate with a proportion of up to 2.5% by weight of caprolactam) was used as starting material. The intake region of the extruder was intertized with nitrogen.

Example 4

As example 1, but a premix made of 93% by weight of caprolactam, 2% by weight of Addonyl 8120 and 5% by weight of Addonyl 8112 (low-temperature impact modifier) from Rhein Chemie Rheinau GmbH was used as starting material. The intake region of the extruder was inertized with nitrogen.

Example 5

After one week, the containers from examples 2 and 3 were separately melted in vacuum, and the melts were combined and poured into a glass beaker controlled to a temperature of 160° C.

Anionic polymerization began after about 1 minute, and a polyamide 6 was produced with 1.2% by weight residual monomer content.

Example 6

After one week, the containers from examples 2 and 4 were separately melted in vacuum, and the melts were combined and poured into a glass beaker controlled to a temperature of 160° C.

Anionic polymerization began after about 1 minute, and a polyimide 6 was produced with 1.4% by weight residual monomer content.

What is claimed is:

1. A process for the production of solid particles comprising a material with a melting point of −20 to 300° C. at atmospheric pressure, the process comprising:
   Mixing within an extruder
   a1) the material in molten form, and
   a2) the material in solid form
   to give a paste,
   forcing the paste through a pelletizing die to form strands, and comminuting the strands into solid particles,
   wherein the material is caprolactam, laurolactam or a mixture thereof.

2. The process as claimed in claim 1, wherein the paste comprises at least 80% by weight of the material.

3. The process as claimed in claim 1, wherein the solid particles have a spherical or cylindrical shape.

4. The process as claimed in claim 1, wherein the solid particles have a size of 0.2 to 20 mm.

5. The process as claimed in claim 1, wherein:
the components a1) and a2) are mixed at a ratio of a1) to a2) of 1:1 to 1:4.

6. The process as claimed in claim 5, wherein the comminuting is done by means of mechanical force.

7. The process as claimed in claim 1, wherein:
the paste further comprises a catalyst and/or an activator.

8. The process as claimed in claim 1, wherein the mixing step comprises at least one of:
i) separately feeding the components a1) and a2) into the extruder; or
ii) feeding the component a2) into the extruder and producing the component a1) within the extruder via heating and/or via introduction of energy from conveying elements and/or shear elements of the extruder, to reach a temperature in the extruder at which some of component a2) has melted; or
iii) feeding the component a1) into the extruder and producing the component a2) within the extruder via cooling of the extruder to a temperature at which some of the component a1) solidifies.

9. The process as claimed in claim 8, wherein the conveying elements and/or shear elements are screws of the extruder.

10. The process as claimed in claim 1, wherein:
the components a1) and a2) are mixed at a ratio of a1) to a2) of 1:1 to 1:4; and
the paste comprises at least 80% by weight of the material.

11. The process as claimed in claim 10, wherein:
the melting point of the material at atmospheric pressure is 50 to 160° C.;
the material has a molar mass of less than 1000 g/mol;
the material, in molten form, has a viscosity at the melting point under atmospheric pressure of less than $1 \times 10^4$ Pa·s;
the ratio of a1) to a2) is 1:1.5 to 1:4.

12. The process as claimed in claim 11, wherein the mixing step comprises one of:
i) separately feeding the components a1) and a2) to the extruder; or
ii) feeding the component a2) into the extruder, and producing component a1) within the extruder via heating and/or via introduction of energy from screws of the extruder, to reach a temperature in the extruder at which some of component a2), previously present in solid form, melts to give component a1); or
iii) feeding component a1) into the extruder and producing component a2) within the extruder via cooling of the extruder to a temperature at which some of the component a1) solidifies.

13. The process as claimed in claim 12, wherein:
the paste further comprises a catalyst and/or an activator;
the ratio of a1) to a2) is 1:2.3 to 1:4;
the paste comprises at least 90% by weight of the material; and
the solid particles have a spherical shape with an aspect ratio of 1 to 3 or cylindrical shape with a diameter of 0.2 to 30 mm and a length of 0.3 to 30 mm.

* * * * *